Dec. 28, 1965
A. R. BENVENUTO
3,226,622
SHUTTLE CAR MOTOR CONTROL
Filed Jan. 30, 1962
3 Sheets-Sheet 1
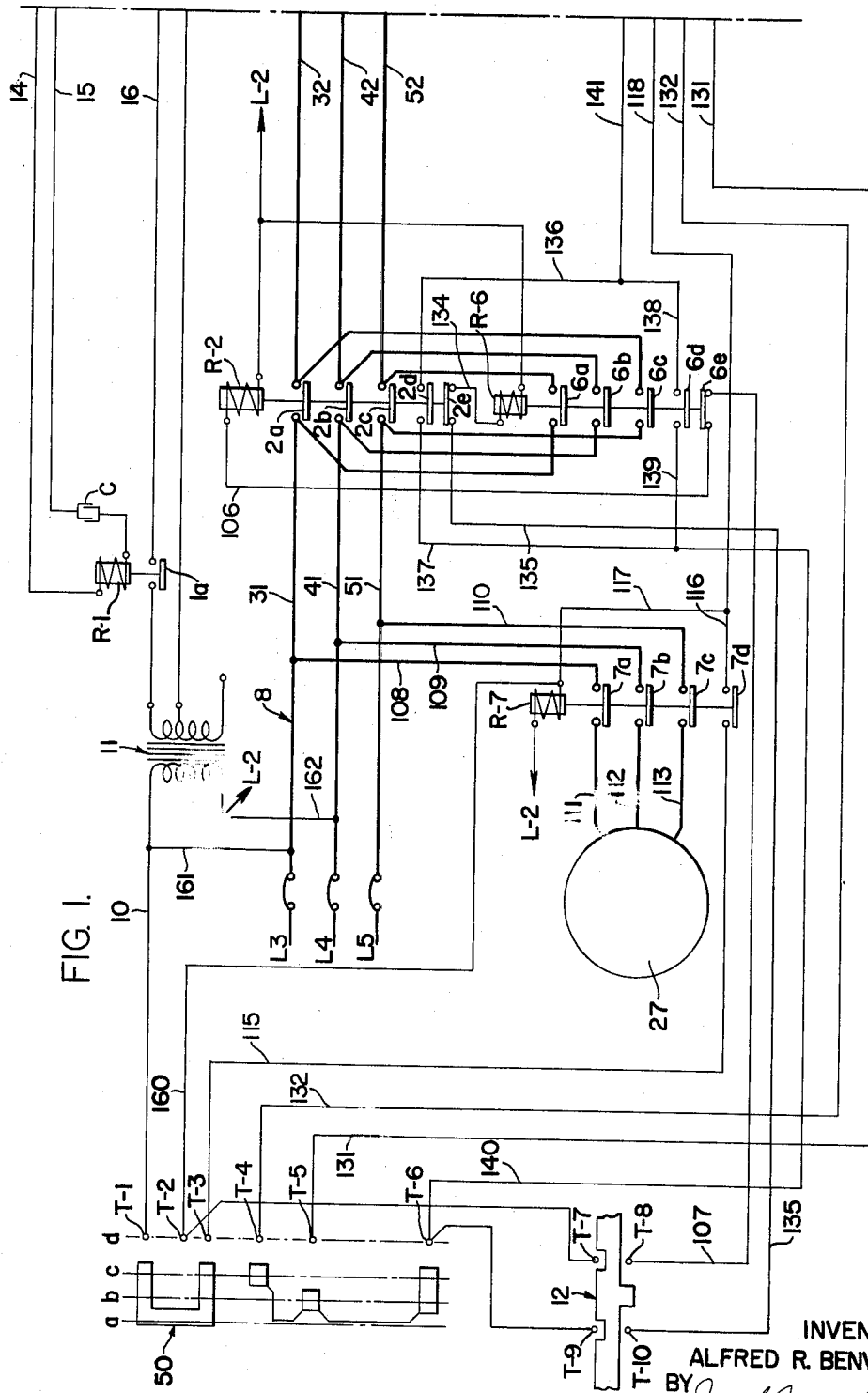
FIG. I.
INVENTOR:
ALFRED R. BENVENUTO
BY Joseph Januszkiewicz
ATTORNEY

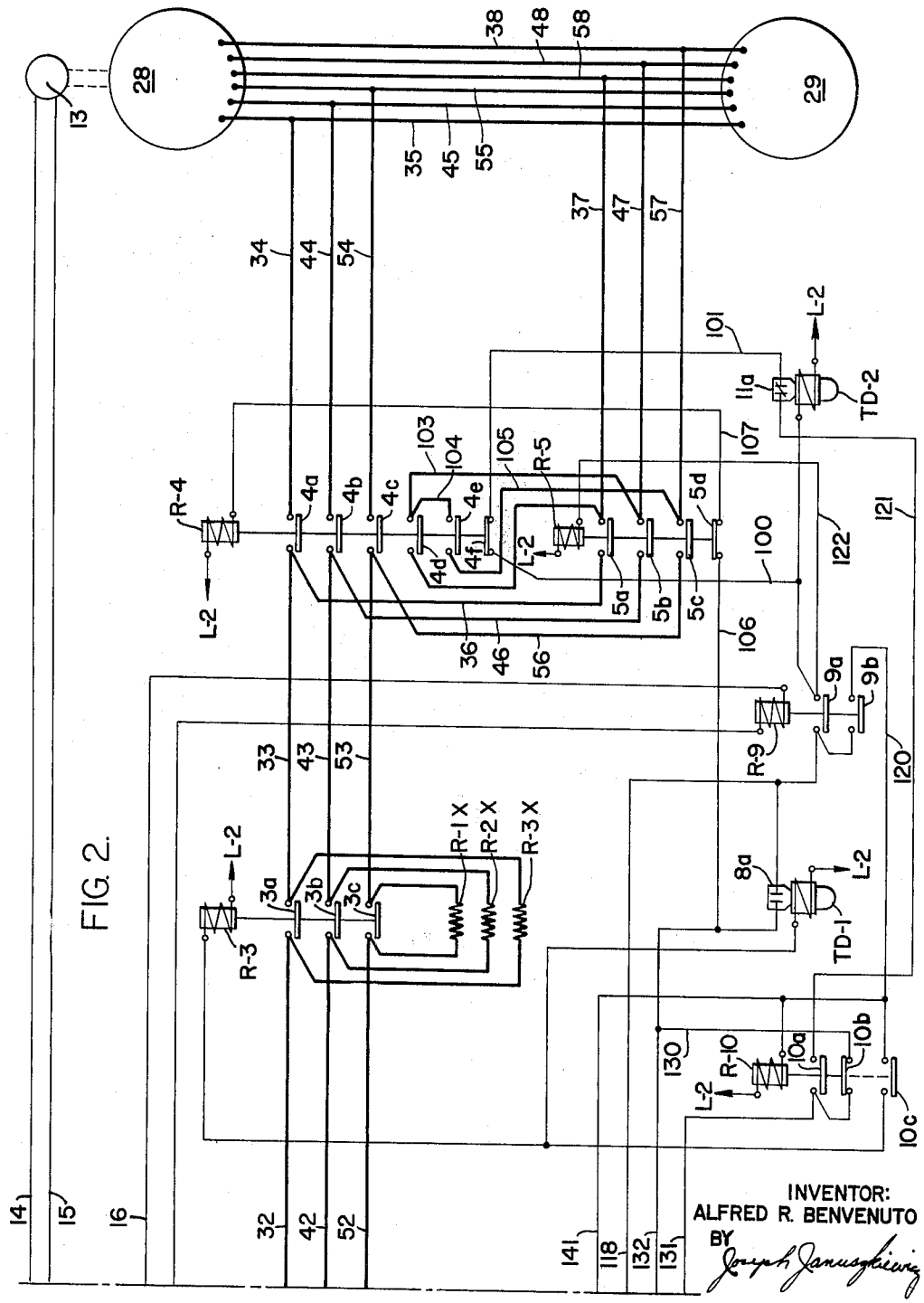

Dec. 28, 1965  A. R. BENVENUTO  3,226,622
SHUTTLE CAR MOTOR CONTROL
Filed Jan. 30, 1962  3 Sheets-Sheet 3
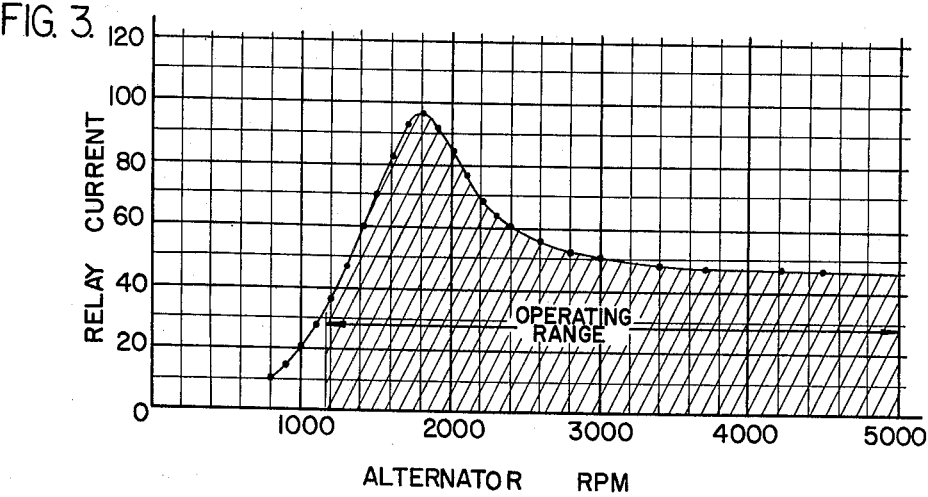
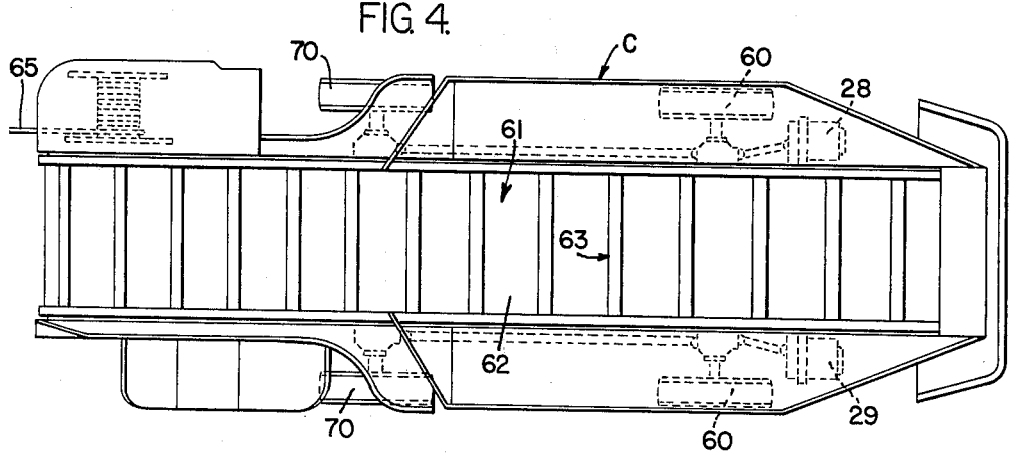
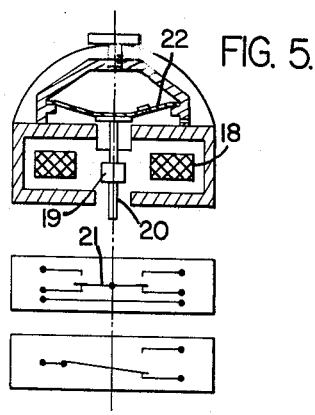
INVENTOR:
ALFRED R. BENVENUTO
BY Joseph Januszkiewicz
ATTORNEY United States Patent Office
3,226,622
Patented Dec. 28, 1965

3,226,622
SHUTTLE CAR MOTOR CONTROL
Alfred R. Benvenuto, Franklin, Pa., assignor to Joy Manufacturing Company, Pittsburgh, Pa., a corporation of Pennsylvania
Filed Jan. 30, 1962, Ser. No. 169,788
9 Claims. (Cl. 318—225)

The present invention relates to shuttle cars and more particularly to the control of the traction motors which supply the power for propelling the shuttle cars.

Shuttle cars are used in mines for the purpose of receiving mined material which is discharged from a miner or loading machine after which the shuttle car is run from the area of the mine face to a mine conveyor line or some other discharge point, where the shuttle car discharges the mined material onto a belt conveyor or other conveyance which carries the mined material out of the mine.

Shuttle cars, as so operated, utilize electric motors and power supply cable which trails the car and extends to a power source in the mine from which power is supplied to motors on the shuttle cars for driving them. It is necessary that the shuttle car be started quickly and attain maximum speed as quickly as possible so that the shuttle car may discharge its load and return empty to the area of the mine face to receive another load of mined material. In starting the shuttle cars from standstill, it is necessary that there be a maximum supply of torque from the traction motors to accelerate the shuttle car to maximum speed and thereafter reduce the torque and propel the motors at high speed. A two speed, single winding, constant horsepower, alternating current motors are particularly adapted to provide the above mentioned torque requirements for propelling a shuttle car wherein the motors provide two speed ranges, one of which is a low speed range in which the motor delivers a high torque, and the other is a high speed range in which the motor delivers a lower torque. It is therefore necessary that means be provided for smoothly and efficiently effecting the changeover from the low speed motion of the motor to the high speed range thereof. Additionally it is necessary to prevent stalling of A.C. multi-speed traction motors when running in high speed or to shift the speed down as where a shuttle car operates on grades up to and including 27% to provide the necessary torque and eliminate overloading of the motors. Accordingly, a speed frequency sensing circuit has been integrated into the traction motors circuit of a shuttle car to insure proper changeover speed from high to low to insure dependable service thereby minimizing the burning out of motors and corresponding failures thereof. The sensing circuit being based on frequency sensitivity is dependable and unaffected by heating. Thus the frequency sensing means governs the control circuit without dependence on voltage which is variable when heating occurs. In addition, the speed frequency sensing circuit eliminates the dependence on mechanical devices for speed sensing which are particularly troublesome in mine haulage vehicles where mine conditions corrode the parts causing malfunctioning. Mechanical speed sensing devices do not provide for the desired serviceability of parts as they wear and break down at the speeds used on shuttle cars.

It is accordingly an object of this invention to provide a new and improved electrical switching system for a shuttle car.

It is a further object of this invention to provide a shuttle car control system wherein the traction motors on a shuttle car will switch from a high speed to a low speed automatically to prevent stalling and burning out of the motors.

It is also a further object of this invention to provide a shuttle car having a traction motor adapted to operate in low and high ranges with a new and improved control system for changeover from one range to the other range.

Another object of this invention is to provide frequency sensing means for preventing the motor from going into high speed if conditions dictate so.

A further object of this invention is to provide a speed sensing means which is responsive to frequency sensing means which prevents high speed on the traction motors to give necessary high torque low speed where grade conditions would burn out the motor at high speed.

Another object of this invention is to provide a novel sensing means which shifts the control circuit for motors to give required torque according to the loading on the motors.

Other objects of the invention will appear hereinafter, the novel features and combinations set forth in the appended claims. In the accompanying drawings:

FIGS. 1 and 2 are circuit diagrams of the traction motor control circuit which when aligned show the entire control circuit of this invention;

FIG. 3 is a graph showing the relationship between the alternator speed versus current of the series resonant circuit for the operating range of the traction motors;

FIG. 4 is a plan view of a shuttle car embodying the present invention;

FIG. 5 discloses diagrammatic illustration of a pneumatic timing device used in the circuit.

A shuttle car C having a pair of oppositely disposed front wheels 60 and a pair of oppositely disposed rear wheels 70 propels the shuttle car in a manner well understood in the art by a pair of traction motors 28 and 29 suitably connected thereto. An elongated compartment 61 extends for the entire length of the shuttle car C such as to provide a flat bed 62 in the bottom thereof, for cooperation with an endless conveyor 63 having scraper flights for moving coal along the bed 62 to facilitate loading of the shuttle car C. As is well understood in the art, coal is loaded into the front end of the shuttle car C, thereafter the conveyor 63 is operated to move the coal rearward in the compartment 61 while simultaneously more coal is loaded into the front portion of the shuttle car C. This operation is continued until the compartment 61 is filled with coal and thereafter the shuttle car C is self-propelled to a main discharge point.

The shuttle car C is driven and controlled by the circuit shown in FIG. 1 wherein a front traction motor 28 and a rear traction motor 29 are driven by power supplied through a suitable trailing cable 65 (FIG. 4) connected to a power source and with the cable 65 wound on a suitable cable reel mounted on the shuttle car C whereby the cable extends either forwardly or rearwardly with respect to the shuttle car depending on the location of the shuttle car with respect to the power source with which the end of the cable is connected.

Electrical motors 28 and 29 are constant horsepower multi-speed squirrel cage induction motors with the power supplied thereto from power lines 8, designated L3, L4 and L5.

The delivery of power by the power lines 8 is controlled by a master controller in the form of a rotary cam switch 50 and a foot switch 12.

Rotary cam switch 50 manually operable is of any well known rotary cam operated type wherein the switch 50 has three operating positions designated a-b-c and an off position d. The a position being the reset, the b position being the fast, and the c position being the slow run position of the traction motors 28. As is well understood in the art, the manually movable rotary cam switch 50 is rotatable into the positions a, b or c positions causes certain of the fixed contacts referred to as terminal, to be described, to be bridged by certain of the rotary cam contacts. As shown in FIG. 1, the rotary cam switch 50 is adapted to make contact with a plurality of longitudinally aligned stationary contacts T–1, T–2, T–3, T–4, T–5 and T–6 with the foot switch 12 adapted to make contact with stationary contacts T–7, T–8, T–9 and T–10. The rotary cam switch 50 and the foot switch 12 are independently operated with the rotary cam switch 50 being rotated into the three above mentioned positions. Power to rotary cam switch 50 is delivered to contacts T–1 from the power source via conductors 161 and 10.

Front traction motor 28 has an alternator 13 suitably positively driven thereby. Alternator 13 generates a signal proportional to the speed of traction motor 28, which signal is monitored by a frequency sensitive circuit comprising a relay coil R–1 (inductance) connected in series with a capacitor C via conductors 14 and 15. The resistance and inductance of the relay coil R–1 and the capacitor C are so selected that their values provide a resonance circuit system which does not respond to frequencies below 78.6 cycles (1180 r.p.m. of motor 28) since the current is below the operative value of 31.5 ma. to actuate relay coil R–1; whereas, beyond 78.6 cycles the current in the speed sensing circuit is well above the critical value of 31.5 ma., thus assuring that relay R–1 will remain energized throughout the remaining frequency range which is equivalent in the instant case to shuttle car speeds up to 10 miles per hour. Referring to FIG. 3 which shows the resistance inductance capacitance series resonant circuit curve for the speed sensing device shows the relationship of the alternator speed in r.p.m. versus relay current. It will be noted that as the relay current approaches the resonant point, the relay R–1 is made to operate. The resistance in the frequency sensitive circuit is kept to a minimum thereby providing for good sensitivity. The energization of the relay coil R–1 moves contact 1a to complete a circuit across a conductor 16 for a purpose to be described.

In order to provide for proper sequence of closing of the contactors to be designated a pneumatic timing delay device designated R–10 is used in the circuit. The timing delay device R–10 is only designated schematically in FIG. 2 and illustrated generally in FIG. 5 since such device is well known in the art and available commercially on the market. Briefly referring to FIG. 5 timing device R–10 comprises a housing with an upper portion being the timing head in which a diaphragm 22 is movably mounted to define a closed chamber. A suitable timing orifice such as an adjustable needle valve is located in uppermost end of the housing for bleeding air trapped by the diaphragm 22 in the chamber. An elongated downwardly extending plunger 19 is mechanically connected to the diaphragm for movement therewith. The plunger 19 has a spindle 20 suitably connected thereto with a suitable contactor 21 at the end thereof for making and breaking a circuit. The timing device R–10 has a solenoid coil 18 suitably located in the housing, circumferentially encompassing the plunger 19. Energization of a solenoid coil 18 moves plunger 19 upwardly with spindle 20 and contactor 21 therewith to either make a contact or break a contact as the case may be.

In operation, when the solenoid coil 18 is not energized, the weight of the plunger plus a suitably located spring holds the diaphragm 22 in a down position, as shown in FIG. 5. When the solenoid coil 18 is energized, the plunger 19 is pulled upward by the magnetic field of solenoid coil 18, thereby exerting an upward force on diaphragm 22, and forcing air outwardly through the timing orifice. The velocity with which the air passes through the orifice and consequently the length of time delay, are controlled by the adjustment of the needle valve 480. At the end of the delay period, the spindle 20 trips a snap action switch. Upon de-energization of the solenoid coil 18 the weight of the plunger 19, spindle 20 and the spring bias 7 pulls the diaphragm downward thereby opening the valve located in the diaphragm and admitting air into the chamber, and the diaphragm 22 and the contacts associated therewith are restored to their original de-energized position shown in FIG. 5.

In the particular pneumatic time delay device R–10, normally open contactors 10a and 10c associated therewith are spaced from their respective contacts such as to close contactor 10c after (½) one half second whereas contactor 10a closes after a (2) two second delay.

Relays hereinafter described are referred to as forward, slow, fast, and reverse relays wherein the prefix forward refers to the function performed such as by the motors whereas resistance relay refers to the function of controlling resistance in the circuit of the motor when the corresponding relays are energized.

In addition to the pneumatic time delay device R–10, a pair of time delay mercury switches TD–1 and TD–2 are used. Since such switches are well known and commercially available on the market such switches will not be described.

Power connections are shown in heavy lines in FIGS. 1 and 2 to facilitate reading of the electrical diagrams. Power lines designated L–3, L–4 and L–5 conduct power via parallel conductors 31, 41 and 51 to the contacts of contactors 2a, 2b, 2c, respectively of a forward relay R–2. The other contacts of contactors 2a, 2b, 2c, are connected in parallel by conductors 32, 42, and 52 to respective contacts of contactors 3a, 3b and 3c of a resistance relay R–3.

The other contacts of contactors 3a, 3b and 3c are connected in parallel by conductors 33, 43, and 53 to respective contacts of contactors 4a, 4b and 4c of a slow relay R–4. The other contacts of contactors 4a, 4b and 4c are connected in parallel to respective conductors 34, 44 and 54 which in turn are connected to respective conductors 35, 45 and 55 which are connected to the respective motors 28 and 29 to provide a relative high torque and slow speed. The respective contacts of each cotactor 3a, 3b tnd 3c (resistance relay R–3) are connected in parallel to respective resistances R–1X, R–2X and R–3X, such that when the relay R–3 is de-energized the respective contactors 3a, 3b and 3c do not make contact with their respective contacts so that current must flow from the respective conductors 32, 42, 52 through the resistance R–1X, R–2X and R–3X respectively to conductors 33, 43 and 53 in order to energize motors 28, 29. Energization of resistance relay R–3 shunts out the resistances R–1X, R–2X and R–3X since contactors 3a, 3b and 3c connect the conductors 32, 42, 52 with conductors 33, 43 and 53 respectively which action supplies a greater power to the motors 28 and 29. Resistances R–1X, R–2X and R–3X remain in the circuit from the power supply L3, L4, L5 to the motors 28 and 29 to provide a starting resistance for the motors during the initial starting of the shuttle car.

A fast relay R–5 having contactors 5a, 5b, 5c and 5d has contactors 5a, 5b and 5c connected via conductors 36, 46, 56 to conductors 33, 34 and 53 respectively. Contactors 5a, 5b, 5c has its other contacts connected by conductors 37, 47 and 57 to conductors 28, 48 and 58 respectively to thereby supply power to the respective windings of motors 28 and 29 for running the respective motors at relatively fast or high speed with low torque.

Slow relay R–4, in addition to having contactors 4a, 4b and 4c has three additional contactors 4d, 4e and 4f. In the de-energized condition, relay R–4 has (5) five of its six contactors normally open, with only contactor 4f being closed to connect conductors 100 and 101 for a purpose to be described. Contactor 4d has one contact connecting conductor 102 to conductor 37. Contactor 4d has its other contact connected via conductor 103 to conductor 47 (adjacent fast relay R–5). Contactor 4e has, one contact connected to conductor 103 adjacent contactor 4d, and the other contact connected via conductor 105 to conductor 57 (adjacent fast relay R–5.) Energization of slow relay R–4 closes contactors 4a, 4b and 4c as well as contactors 4d and 4e. The latter contactors short out the line 37, 47 and 57 to the high speed windings of the motors to provide low speed whereby the motor windings are connected in parallel or star as is well known and understood in the art to give low speed. In shorting out lines 37, 47 and 57, the line 37 is connected via contactor 4d to line 103 which connects to line 47 whereas contactor 4e connects line 47 to line 57. Fast relay R-5 in addition to having normally open contactors 5a, 5b, 5c has a normally closed contactor 5d connecting conductors 106 and 107. Energization of fast relay R-5 connects the respective power lines via lines 33, 43 and 53 via the respective contactors 5a, 5b and 5c to provide a delta connection to the motor as is well known and understood in the art to provide low torque, high speed.

A reverse relay R-6 has four normally open contactors 6a, 6b, 6c and 6d, and a normally closed contactor 6e connecting conductors 106 and 107. Contactors 6a, 6b and 6c upon closing connect conductors 31, 41 and 51 to conductors 52, 42, and 32 respectively via suitable conductors thereby reversing the power input from power lines L3, L4 and L5 to the motors 28 and 29 to provide for a change in directions thereof.

Relay R-7 having normally open contactors 7a, 7b, 7c is connected to power lines 31, 41 and 51 via conductors 108, 109 and 110 respectively, such that upon energization of relay R-7 contactors 7a, 7b and 7c operatively connect conductors 108, 109 and 110 to conductors 111, 112 and 113 respectively which in turn control the energization of pump motor 27, normally open contactor 7d of relay R-7 upon closing connects conductor 115 from terminal T-3 of rotary cam switch 50 to conductor 116 which in turn branches via conductor 117 to the coil of relay R-7 and via conductor 118 to a normally open switch 8a controlled by time delay device TD-1. Conductor 118 is also connected to normally open contactors 9a and 9b of a time control relay R-9 wherein energization of relay R-9 closes contactors 9a and 9b whereby contactor 9b connects conductor 118 to conductor 120 and contactor 9a connects conductor 118 to the time delay device TD-2 and conductor 122. Conductor 122 is connected to control the energization of fast relay R-5. Time delay device TD-2 controls a normally closed switch 11a which connects conductors 121 and 101 wherein conductor 101 is connected to normally closed contactor 4f of slow relay R-4. Conductor 160 connects relay R-7 and conductor 117 with terminal T-2 of rotary cam switch 50.

Relay R-10 having a pair of normally open contactors 10a and 10c has a closed contactor 10b that connects conductor 130 with conductor 131 wherein conductor 131 is connected to terminal T-5 of rotary cam switch 50. Conductor 130 is connected to the normally open switch of time delay device TD-1 as well as conductor 106 leading to normally closed contactor 5d of fast relay R-5. In addition conductor 130 is connected via conductor 132 to terminal T-4 of rotary cam switch 50.

Referring to forward relay R-2 wherein reference was made to normally open contactors 2a, 2b and 2c as connected to control the power lines 31, 41, 51 to conductors 32, 42, 52 respectively, additional contactors 2d (normally open) and 2e (normally closed) are similarly dependent on forward relay R-2. Normally closed contactor 2e is connected by one contact via conductor 132 to control energization of reverse relay R-6 while the other contact via conductor 135 is connected to terminal T-10 of foot switch 12. Energization of forward relay R-2 closes contactor 2d and bridges conductors 136 and 137.

Previously mentioned reverse relay R-6 has a normally open contactor 6d such that upon energization of relay R-6 the contactor 6d connects conductors 138 and 139. Conductor 139 connects with conductor 137 to conductor 140, which conductor 140 is connected to terminal T-6 (rotary cam switch 50) and thereby to terminal T-9 (foot switch 12). Conductor 138 connects with conductor 136 (from relay R-6) to conductor 141 which is connected to relay R-10 and conductor 120.

The energization of relay R-9 is controlled by the contactor 1a of relay coil R-1 such as to conduct power taken from a transformer 11 taken off power lines 31 and 41 via conductors 161 and 162.

Relays R-3, R-4, R-5 and R-7, time delay devices TD-1 and TD-2, as well as conductor 162 are connected to power line 41 via connection L2 such that the omission of the physical connection is made to facilitate clarity of the various conductors.

Prior to starting the movement of the shuttle car from standstill the operator rotates rotary cam switch 50 to the reset position which as a, bridging terminals T-1, T-2, and T-3; thus, power from the source is conducted via conductors 161, and 10 to conductor 160 to energize relay R-7 which closes contactors 7a, 7b, 7c and 7d to thereby connect power from the source via conductors 31, 41, 51 to conductors 111, 112 and 113 respectively to drive the pump motor 27 that drives a pump which supplies hydraulic fluid to a hydraulic motor. In addition, power from the power source via conductors 161 and 10 through bridged terminals T-1 and T-3 is conducted via conductor 115, closed contacts 7d and conductors 116 and 117 to relay R-7 thence to power line 41 via connection L-2 to effect a holding circuit.

With the pump motor running, the holding circuit closed, foot switch 12 is moved forward bridging terminals T-7, T-8 and T-9 while the rotary cam switch is moved to the b position "fast" to start the shuttle car accelerating on the low speed winding with the resistances R-1X, R-2X, R-3X in the circuit. Power from the source is delivered by conductors 161 and 10 to terminal T-1 (rotary cam switch 50) and T-3 thence via conductor 115 through the closed contactor 7d of relay R-7 to conductor 117 to maintain energization of relay R-7 while simultaneously conducting power via conductor 160 to terminal T-2 of rotary cam switch 50 as well as terminal T-7 of foot switch 12 thence via conductor 107 to normally closed contactor 6e of relay R-6 thence via conductor 106 to energize forward relay R-2 thence via connection L2 to power line 41. Energization of forward relay R-2 closes normally open contactors 2a, 2b, 2c and 2d.

Terminal T-7 in addition to connecting power from the source to conductor 107 connects the power source of foot switch 12 to terminal T-9 which is bridged with terminal T-6 as well as terminal T-5 in the b position. Terminal T-5 connects the power source to conductor 131 for conducting the power source via closed contactor 10b of time delay relay R-10 thence via conductors 130, 132 and 106 through normally closed contactor 5d via conductor 107 to energize slow relay R-4, thence via connection L-2 to power line 41. Energization of slow relay R-4 closes open contact switches 4a, 4b and 4c to thereby connect a power source from power lines 31, 41, 51 via closed contactors 2a, 2b, 2c respectively to power lines 32, 42, and 52 which are connected via resistances R-1X, R-2X, R-3X respectively to conductors 33, 43, 53, through closed contactors 4a, 4b, 4c, of slow relay R-4 to conductors 33, 44 and 54 respectively which in turn are connected to respective conductors 35, 45 and 55 for connection to the respective motors 28 and 29 to provide slow speed high torque.

Terminal T-6 connects power from the power source via conductor 140 thence via conductor 137 through closed contactor 2d of forward relay R-2 to conductor 136 to energize time delay relay R-10 for a purpose to be described.

With the pump motor 27 running, the holding circuit closed, with the foot switch depressed in a forward direction as indicated previously, and with the speed selector rotary cam switch 50 in the fast position, the respective traction motors 28 and 29 develop a high torque low speed since the power supply is conducted through the respective resistances R–1X, R–2X, R–3X prior to their delivery to conductors 35, 45 and 55 respectively to the windings of the motors 28 and 29. After a ½ second delay time delay relay R–10 closes contactor 10c (contactor 10a is not closed since its spacing from its contacts is greater) to conduct power from terminal T–6 via conductors 140, 137, closed contactor 2d, conductor 136 thence via closed contactor 10c of relay R–10, to actuate time delay device TD–1 as well as energize the resistance relay R–3 to thereby move the respective contactors 3a, 3b, 3c to their closed position and thereby connect the power from the source via conductors 31, 41, 51 through conductors 32, 42, 52 respectively to conductors 33, 43, 53 to the respective windings of traction motors 28 and 29 to thereby minimize shock loading to the traction drive components respective motors at low speed on start since the resistances R–1X, R–2X and R–3X are respectively shunted out. Essentially power is connected to relay R–5 via (1) the normally closed contactor 11a of time delay device TD–2 by conduction of current from terminal T–5, conductor 131, contactor 10a, conductor 121 through closed contactors 11a, and 4f, via conductors 100, 122 to fast relay R–5 and via (2) terminal T–2, conductors 160, 117, 118, contactor 9a (R–9) via conductor 122 to fast relay R–5.

Upon completion of the two second timing cycle by time delay device TD–1, contactor 8a closes. In this instance as all other timing devices herein referred to the second cycle is in both directions such that if it takes two seconds for the contactor to close upon energization of the control relay then it also takes two seconds before the contactor opens upon de-energization of the relay. Closing of contactor 8a has no effect at this point.

Upon completion of the 2 second timing cycle by time delay device TD–2, contactor 11a is opened, thus one of the above mentioned parallel circuits to fast relay R–5 is opened so that only the frequency sensing circuit is responsible for the energization of fast relay R–5 (via T–2, conductors 160, 117, 118, 122). This in effect locks in the high speed circuit which is thereafter responsive to speeds below 1180 r.p.m. to automatically switch the power from the high speed winding to the low speed winding of motors 28 and 29.

With the traction motors 28 and 29 running at low speed which is below 900 r.p.m., time delay relay R–10 in addition to closing contactor 10c as described above additionally closes contactor 10a after a 2 second delay from the time of energization thereof to connect the power source through terminal T–5 of rotary cam switch 50 via conductor 131 thence through contactor 10a, through conductor 121, through the closed switch 11a of time delay device TD–2 through conductor 101 through normally closed contactor 4f, through conductor 100 to actuate the timing device TD–2 while simultaneously passing through conductor 122 to actuate or energize fast relay R–5. The slow relay R–4 is de-energized when time delay relay R–10 is actuated at the end of its time delay cycle, such that the contactor 10b interrupts the flow of current through the contactor 10b which conveys current through conductor 106 through normally closed contactor 5d via conductor 107 to relay R–4. At this time, time delay relay TD–1 has ½ second before it will close its normally open contactor 8a while time delay device TD–2 just begins to time for two seconds before it opens its normally closed contactor 11a for a purpose to be described. With the traction motors 28 and 29 now running at high speed wherein the motor speed is above 1180 r.p.m. the alternator 13 which is coupled mechanically to the traction motor 28 provides an output signal which energizes relay coil R–1 to thereby close contactor 1a which operatively connects conductor 16 with transformer 11 to provide a sensing signal for relay R–9 for energization thereof, which action causes the normally open contactors 9a and 9b to close which action connects the power source via terminal T–2 of rotary cam switch 50 via conductor 160, conductors 117, 118, to contactors 9a and 9b respectively whereby the current via contactor 9b is conducted via conductor 120 to contactor 10c to maintain energization of resistance relay R–3 whereas contactor 9a conducts current via conductor 122 to maintain energization of fast relay R–5. At this time, time delay device TD–2 has one and one-half seconds of time before its normally closed switch 11a is moved to open position. Thus the speed sensing circuit is locked in and there are two parallel current circuits to relay R–5.

With the traction motors 28 and 29 running at full speed wherein the motor speed is above 1180 r.p.m. the foot switch 12 may be released as wherein the car is coasting such that the power supply from power lines 31, 41, 51 is conducted via contactors 2a, 2b, 2c conductors 32, 42, 52 and contactors 3a, 3b, 3c through conductors 33, 43, 53 and via conductors 36, 46, 56 to closed contactors 5a, 5b, 5c of fast relay R–5 to the conductors 37, 47, 57 which are connected to the respective conductors 38, 48, 58 of traction motors 28 and 29 to provide a high speed thereof above 1180 r.p.m. Should the foot switch 12 be depressed again into the forward position, the circuit will remain essentially the same as there is no recycling of the resistance of low speed. However in the instance where the shuttle car encounters a grade or inclination and where the operator depresses the foot switch 12 into forward condition the traction motors 28 and 29 will lose their speed because of the relative inclination of the road bed and the motors 28 and 29 will fall below 1180 r.p.m. which will cause the shuttle car motors to shift to a slow speed automatically as will be described. Where the speed of the traction motor 28 falls below 1180 r.p.m. alternator 13 generates a signal which is insufficient to maintain energization of coil R–1 thereby opening contactor 1a which de-energizes relay coil R–9 thereby opening contactors 9a and 9b. The opening of contactor 9a interrupts the flow of current through conductor 122 from conductor 118 such that there is no flow of current to the fast relay R–5 with the corresponding result that the flow of current through conductor 118 thence flows through the closed contactor 8a of energized time delay relay TD–1 through conductor 106 via closed contactor 5d thence through conductor 107 to energize the slow relay R–4 which then shunts the current from the fast relay windings of traction motors 28, 29 to the conductors 35, 45, 55 respectively of traction motors 28 and 29 to provide a slow speed for the traction motors with a resulting high torque. This condition of the traction motors enables the shuttle car to maintain a safe speed with a resulting high torque on upgrade road beds such that the burning out motors due to the motors running at high speed and low torque is avoided.

Where it is desired to reverse speed the operation is substantially the same as that described except that foot switch 12 is moved in the leftward direction as viewing FIG. 1 so as to bridge terminals T–7, T–9 and T–10 such that current is conducted via conductor 135, closed contactor 2a, to energize reverse relay R–6.

Where it is desired to maintain slow speed from standstill the rotary cam switch 50 is moved to the c position or slow position such as to bridge terminals T–1, T–3, T–4 and T–6, with the foot switch 12 beiing moved forwardly to bridge terminals T–7, T–9 and T–8. The holding circuit is energized and maintained as previously described. Power is conducted via T–8, conductor 107 to energize forward relay R–2, and via T–4, conductors 132, 106 to energize slow relay R–4 to provide for low speed high torque with resistances R–1X, R–2X, R–3X in the circuit for starting. In addition time delay relay R-10 is energized for its ½ second timing cycle. Upon completion of the ½ second R-10 closes contactor 10c to conduct current via contactor 10c to the resistance relay R-3 to shunt out the starting resistances R-1X, R-2X, R-3X, while simultaneously time delay device TD-1 is energized for its 2 second timing cycle; however, there is no completion of a circuit to the fast relay R-5, thus maintaining the traction motors 28 and 29 at low speed.

Having described a preferred embodiment of this invention in accordance with the patent statutes, it is to be realized that modifications thereof may be made without departing from the broad spirit and scope of this invention. Accordingly, it is respectfully requested that this invention be interpreted as broadly as possible and be limited only by the prior art.

What is claimed is:

1. In a shuttle car comprising a motor means for operating traction means to propel the shuttle car, means for connecting a source of power to the motor means to drive the motor means in a low speed range in which the motor means delivers a high torque, alternate means operative for a limited period of time for connecting a source of power to the motor means to drive the motor means in a high speed range in which the motor means delivers a low torque, speed responsive means operative after a minimum speed has been achieved by the motor means during said period of time for maintaining the energization of the motor means in said high speed range for as long as at least said minimum speed is maintained, and means for connecting the motor means in said low speed range when said speed responsive means is not operative after said period of time has expired.

2. In a shuttle car comprising a motor means for operating traction means to propel the shuttle car, means for connecting a source of power to the motor means to drive the motor means in a low speed range for a first limited period of time in which the motor means delivers a high torque, alternate means operative for a second limited period of time immediately after said first period of time for connecting a source of power to the motor means to drive the motor means in a high speed range in which the motor means delivers a low torque, speed responsive means operative after a minimum speed has been achieved by the motor means during said second period of time for maintaining the energization of the motor means in said high speed range for as long as at least said minimum speed is maintained, and means operative after commencement of said second period of time for connecting the motor means in said low speed range when said speed responsive means is not operative after said second period of time has expired.

3. A shuttle car as defined in claim 2 in which said first and second periods of time are equal.

4. A shuttle car as defined in claim 2 in which said last mentioned means includes a time delay device.

5. A vehicle motor control comprising, a control circuit having input connections through which said circuit is electrically energized, said control circuit having output connections connected to winding means of electrical motor means, said circuit including first means operable upon electrical energization of said circuit to electrically energize said winding means for a first limited period of time so that said motor means has a first torque output, said circuit including second means operable upon electrical energization of said circuit to electrically energize said winding means for a second limited period of time upon termination of said first period of time so that said motor means has a second torque output, said first torque output being higher than said second torque output, speed responsive means operative after a minimum speed has been achieved by the motor means for maintaining the electrical energization of said motor means to deliver said second torque output for as long as at least said minimum speed is maintained, and said second means including means reestablishing electrical energization of said first means upon electrical deenergization of said second means.

6. A vehicle motor control comprising, switch means movable to open and closed positions, a control circuit having input connections connected to said switch means through which said circuit is electrically energized, said control circuit having output connections connected to winding means of electrical motor means, said circuit including first means operable upon electrical energization of said circuit to electrically energize said winding means for a first limited period of time so that said motor means has a first torque output, said circuit including second means operable upon electrical energization of said circuit to electrically energize said winding means for a second limited period of time upon termination of said first period of time so that said motor means has a second torque output, said first torque output being higher than said second torque output, speed responsive means operative after a minimum speed has been achieved by the motor means for maintaining the electrical energization of said motor means to deliver said second torque output for as long as at least said minimum speed is maintained, said second means including means reestablishing electrical energization of said first means upon electrical deenergization of said second means, and said switch means being connected to said input connections such that said second means cannot be electrically energized after having been previously electrically energized until said switch means is first opened and subsequently closed.

7. A shuttle car comprising, a body, movable traction means carried by said body for propelling said body upon movement of said traction means, electrical motor means having the rotor thereof connected to said traction means for causing movement thereof, said motor means having first and second electrically energizable winding means, an electrically energizable controller means, a circuit connecting said controller means to said first and second winding means, said circuit having a first electrically energizable control means for controlling the electrical energization of said first winding means when said first control means is electrically energized, said circuit having a second electrically energizable control means for controlling the electrical energization of said second winding means when said second control means is electrically energized, said circuit having a first electrically energizable time delay device for controlling in part the electrical energization of said first control means when said first time delay device is electrically deenergized, said second control means having electrically connected means when said second control means is electrically deenergized for additionally controlling the electrical energization of said first control means, said circuit having a second electrically energizable time delay device for controlling in one manner the electrical energization of said second control means after said second time delay device is electrically energized, said first time delay device having electrically connectable means operable after energization of said first time delay device to electrically energize said second time delay device, an auxiliary control electrically energized by a predetermined rotational movement for a given unit of time of said traction means for controlling the electrically energization of said second control means by said circuit independently of the control of the energization thereof by said first time delay device, said second time delay device being operative after electrical energization to discontinue the electrical energization of said second control means in said one manner, and said controller means being operable to selectively electrically energize and deenergize said first time delay device.

8. A shuttle car comprising, a body, movable traction means carried by said body for propelling said body upon movement of said traction means, electrical motor means having the rotor thereof connected to said traction means for causing movement thereof, said motor means having first and second electrically energizable winding means, an electrically energizable controller means, a circuit connecting said controller means to said first and second winding means, said circuit having a first electrically energizable control means for controlling the electrical energization of said first winding means when said first control means is electrically energized, said circuit having a second electrically energizable control means for controlling the electrical energization of said second winding means when said second control means is electrically energized, said circuit having a first electrically energizable time delay device for controlling in part the electrical energization of said first control means when said first time delay device is electrically deenergized, said second control means having electrically connected means when said second control means is electrically deenergized for additionally controlling the electrical energization of said first control means, said circuit having a second electrically energizable time delay device for controlling in one manner the electrical energization of said second control means after said second time delay device is electrically energized, said first time delay device having electrically connectable means operable after energization of said first time delay device to electrically energize said second time delay device, an auxiliary control electrically energized by a predetermined rotational movement for a given unit of time of said traction means for controlling the electrically energization of said second control means by said circuit independently of the control of the energization thereof by said first time delay device, said second time delay device being operative after electrical energization to discontinue the electrical energization of said second control means in said one manner, said circuit having a third electrically energizable time delay device for controlling the electrical energization of said first winding means after electrical energization of said second control means in said one manner or by said auxiliary control has been discontinued, and said controller means being operable to selectively electrically energize and deenergize said first time delay device.

9. A shuttle car as defined in claim 8 in which a portion of said first and said second and third time delay devices are of the same duration.

References Cited by the Examiner
UNITED STATES PATENTS

| | | | |
|---|---|---|---|
| 2,111,423 | 3/1938 | Given | 318—328 |
| 2,250,141 | 7/1941 | Thurston | 318—461 |
| 2,974,267 | 3/1961 | Holcombe | 318—224 |
| 3,011,594 | 12/1961 | Borden | 318—224 |

ORIS L. RADER, *Primary Examiner.*